(12) United States Patent
Kemper et al.

(10) Patent No.: US 8,061,493 B2
(45) Date of Patent: Nov. 22, 2011

(54) POWER CONDUCTING SYSTEM FOR LONG DISTANCES

(75) Inventors: Uwe Kemper, Kreuztal (DE); Thomas Ameis, Siegen (DE)

(73) Assignee: Kabelschlepp GmbH, Siegen (DE)

( * ) Notice: Subject to any disclaimer, the term of this patent is extended or adjusted under 35 U.S.C. 154(b) by 95 days.

(21) Appl. No.: 12/311,869

(22) PCT Filed: Oct. 15, 2007

(86) PCT No.: PCT/EP2007/060970
§ 371 (c)(1),
(2), (4) Date: May 19, 2009

(87) PCT Pub. No.: WO2008/046811
PCT Pub. Date: Apr. 24, 2008

(65) Prior Publication Data
US 2010/0320049 A1    Dec. 23, 2010

(30) Foreign Application Priority Data
Oct. 16, 2006  (DE) ......................... 10 2006 049 434

(51) Int. Cl.
*B66C 13/12*    (2006.01)
(52) U.S. Cl. ....................... 191/12 R; 191/12 C; 248/49
(58) Field of Classification Search .............. 191/12 R, 191/12 C; 248/49
See application file for complete search history.

(56) References Cited

U.S. PATENT DOCUMENTS

| | | | |
|---|---|---|---|
| 3,157,376 A * | 11/1964 | Merker et al. | 248/49 |
| 3,590,854 A * | 7/1971 | Cork | 137/355.16 |
| 4,129,277 A * | 12/1978 | Tenniswood | 248/51 |
| 4,373,324 A * | 2/1983 | Janos | 59/78.1 |
| 4,462,565 A * | 7/1984 | Johnson | 248/51 |
| 4,789,120 A * | 12/1988 | Spidel | 248/49 |
| 5,649,415 A * | 7/1997 | Pea | 59/78.1 |

(Continued)

FOREIGN PATENT DOCUMENTS

DE    1 131 964    6/1962
(Continued)

OTHER PUBLICATIONS

English language Abstract, Translated Description and Claims of WO 03/060346 A1, European Patent Office's esp@cenet.com database, 8pp.

(Continued)

*Primary Examiner* — Joe Morano, IV
*Assistant Examiner* — Jason C Smith
(74) *Attorney, Agent, or Firm* — Smith Law Office

(57) ABSTRACT

The invention relates to a power conducting system comprising at least one power conducting unit (1) for conducting wires, cables, tubes, or similar items between a static and a mobile connection region by forming a curved section (6). The power conducting unit is formed by segments (3) connected together in a jointed manner and is conducted along a road in a conducting system. The conducting system has multiple first and second conducting elements (7,8). The first conducting elements (7) are arranged in a first plane, and the second conducting elements (8), in a second plane, spaced apart from each other. First elements (9) are arranged on some segments of the power conducting unit, and second elements (10) are arranged alternately on other segments. The first elements work together with the first conducting elements, and the second elements, with the second conducting elements.

12 Claims, 8 Drawing Sheets

U.S. PATENT DOCUMENTS

Figure 1:
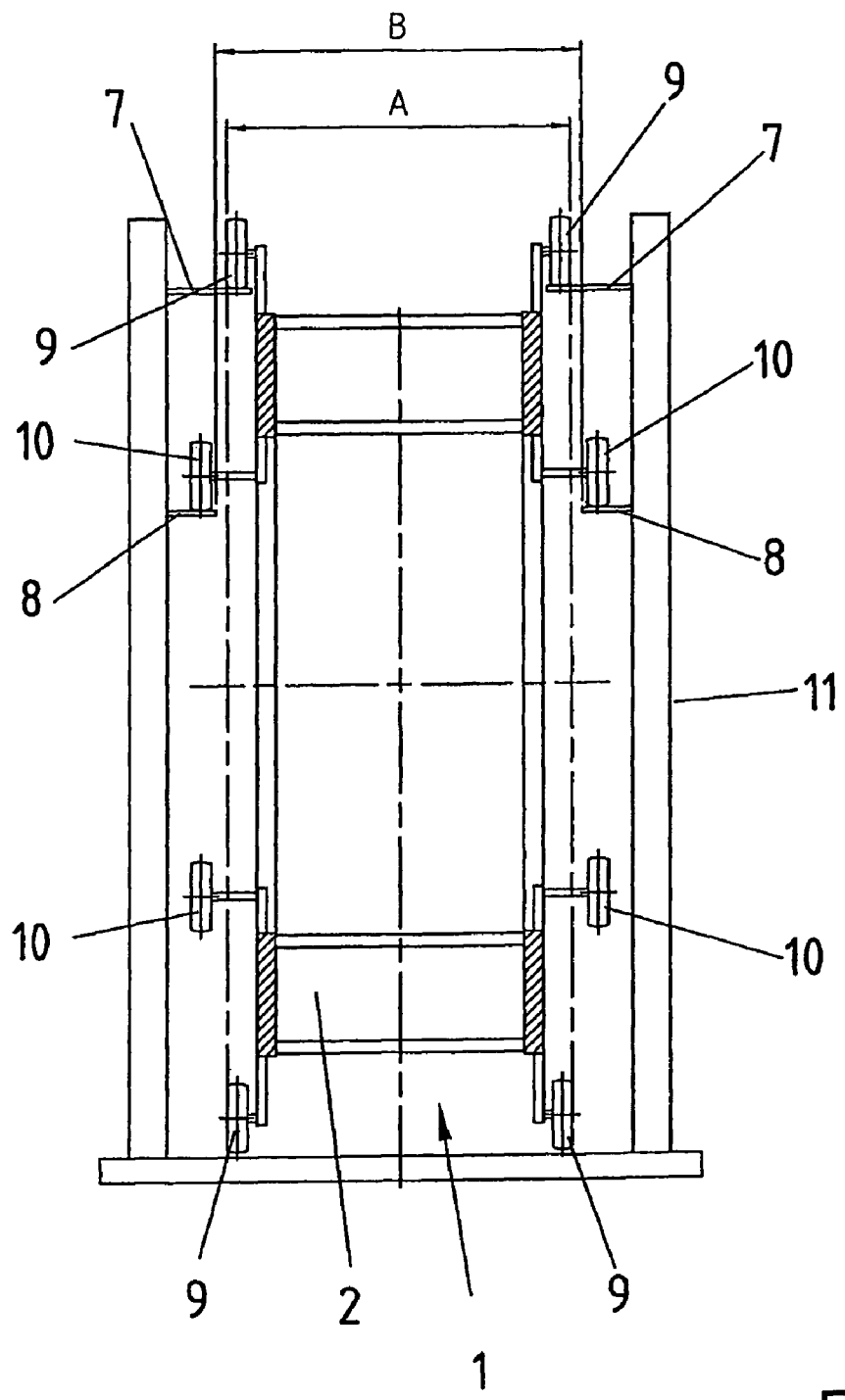

| | | | |
|---|---|---|---|
| 6,270,258 B1 * | 8/2001 | Blase | 384/26 |
| 6,612,104 B2 * | 9/2003 | Blase | 59/78.1 |
| 7,234,292 B1 * | 6/2007 | O'Rourke et al. | 59/78.1 |
| 7,310,935 B2 * | 12/2007 | Worms | 59/78.1 |
| 7,426,824 B2 * | 9/2008 | Iwami et al. | 59/78.1 |
| 7,434,382 B2 * | 10/2008 | Iwami et al. | 59/78.1 |

FOREIGN PATENT DOCUMENTS

| | | |
|---|---|---|
| EP | 0 725 228 A1 | 8/1996 |
| WO | WO 03/060346 A1 | 7/2003 |

OTHER PUBLICATIONS

English language Translated Description and Claims of DE 1 131 964, European Patent Office's esp@cenet.com database, 3pp.

Form PCT/IB/338, Notification of Transmittal of Translation of the IPRP received May 22, 2009, 1 p.

Form PCT/IB/373, International Preliminary Report on Patentability received May 22, 2009, 1p.

Form PCT/ISA/237, Translation of Written Opinion of the International Searching Authority received May 22, 2009, 6pp.

* cited by examiner

POWER CONDUCTING SYSTEM FOR LONG DISTANCES

The subject matter of the invention relates to an energy guidance system comprising at least one energy guidance unit for guidance of cables, lines, hoses or the like between a fixed-position and a moving connecting area, with a curved area being formed wherein the energy guidance unit has segments which are connected to one another in an articulated manner, as well as a guidance system in which the at least one energy guidance unit is guided along a movement path.

Energy guidance units are used in various apparatuses, machines and devices wherever it is necessary to transport consumables, energy or the like by means of lines, hoses or the like from a fixed-position connection to a moving connection of a consumer. The energy guidance unit may consist of one or more strands.

When long movement distances are involved, one problem is that the energy guidance unit and the segments of the energy guidance unit are subject to high loads as a result of the natural weight of the energy guidance unit and the weight of the lines and hoses. The energy guidance unit may, for example, be formed from individual chain links. An energy guidance unit such as this is also referred to as an energy guidance chain or, in brief, as an energy chain.

A high load occurs on the energy guidance unit in particular when an upper strand of the energy guidance unit slides on the lower strand, as a result of which high friction forces occur between the two strands, which on the one hand lead to rapid wear of the energy guidance unit, and on the other hand to a movement resistance, wherein the force or energy which is required for movement of the energy guidance unit is increased and there is a risk of fracturing of the energy guidance unit or of its attachment points.

It is known that the friction resistance between the areas of the strands which rub on one another can be reduced for example by so-called sliding shoes which are arranged on at least some segments of the energy guidance unit.

Furthermore, EP 0 725 228 A1 discloses an energy guidance unit which has a transport carriage, provided with wheels, between the upper strand and the lower strand, wherein the wheels are suitable for rolling on the upper face of the lower strand and on the lower face of the upper strand at the same time.

For synchronous movement of the transport carriage with the moving end of the energy guidance unit, the transport carriage has a cable pulley at each of its opposite ends. The moving connection, which is connected to the moving end of the energy guidance unit, is connected to two cables. One cable is passed over one cable pulley at one end, and the other cable is passed over a further cable pulley at the opposite end of the transport carriage. The ends of the cables are attached to the fixed-position connection of the energy guidance unit. The transport carriage is moved by one or the other of the cables with the movement of the driver of the energy guidance unit, dependent on the direction in which the energy guidance unit is being moved.

Furthermore, WO 03/060346 discloses an energy guidance system which has an energy guidance unit which has members or segments which are connected to one another in an articulated manner. One end of the energy guidance unit can be attached in a fixed position. The other end of the energy guidance unit can be moved in the longitudinal direction thereof. The energy guidance unit has an upper strand and a lower strand which are connected to one another via a curved area in the form of an arc. The length of the upper strand and/or of the lower strand is dependent on the position of the variable-position second end with respect to the fixed-position first end of the energy guidance unit. As the energy guidance unit moves, the position of the curved area also changes along the movement path. At least one means, which can move in a reciprocating manner in the longitudinal direction of the energy guidance unit, is arranged between the upper strand and the lower strand. The means is operatively connected to the upper strand in such a way that, while the operative connection exists, the means is moved only by the upper strand. The operative connection is a friction connection.

According to the prior art as described above, it is necessary to provide an auxiliary means between the upper strand and the lower strand, by means of which the friction resistance between the upper strand and the lower strand can be reduced.

Against this background, the present invention is based on the objective of specifying an energy guidance system by means of which the friction resistance in the case of long movement distances is reduced. A further aim of the invention is to specify an energy guidance system in which different arrangements of at least one energy guidance unit can also be implemented.

According to the invention, this object is achieved by an energy guidance system having the features of claim 1. Advantageous developments and refinements of the energy guidance system according to the invention are the subject matter of the dependent claims.

The energy guidance system according to the invention comprises at least one energy guidance unit and a guidance system in which the at least one energy guidance unit is guided along a movement path. The energy guidance unit is suitable and intended for guidance of lines, cables, hoses or the like between a fixed-position and a moving connecting area, with a curved area being formed. The energy guidance unit is formed by segments which are connected to one another in an articulated manner. The guidance system of the energy guidance system according to the invention has a plurality of first and second guidance elements. The first guidance elements are arranged on a first plane and the second guidance elements are arranged on a second plane, at a distance from one another. First elements are provided on some segments of the energy guidance unit. Second elements are arranged on some other segments. The arrangement of the elements is chosen such that a second or a first guidance element in each case at least partially overlaps the gap area in the area of the gaps between the first elements or the second elements. The first elements interact with the first guidance elements, and the second elements interact with the second guidance elements. During the movement of the energy guidance unit, the first elements move on the first guidance elements, while the second elements are guided on the second guidance elements. For example, when a first guidance element is located in a gap area between two first guidance elements, then the energy guidance unit is supported by the second elements being located on the second guidance elements.

The guidance elements and the elements are designed such that those elements of the upper strand which are arranged on the segments can be passed via the curved area into the lower strand. If an element which is arranged on a segment is considered, then this element moves on an essentially cycloid path when being moved from the upper strand via the curved area into the lower strand.

The guidance elements or at least one guidance element are or is preferably essentially in the form of a strip or strips. In this case, a refinement is particularly preferable in which at least one end area of at least one guidance element is angled. This prevents any collision between the first guidance elements and the first elements. In one particularly preferable refinement of the guidance elements, these guidance elements are formed, for example, by a C-shaped profile. This results in rise protection of the energy guidance unit by using simple means. When an energy guidance unit is being moved in the pushing mode, there is a risk of rising occurring in particular in the upper strand of the energy guidance unit, and this is prevented by the essentially C-shaped guidance elements.

The guidance elements are preferably arranged such that the upper strand is guided at the level of the curved area. This avoids rearward curvature of the upper strand, which leads to a reduction in the load and thus in the wear on the energy guidance unit and cables, lines or hoses guided in the energy guidance unit.

Yet another advantageous refinement of the invention proposes that the first guidance elements be arranged at a shorter distance from the energy guidance unit than the second guidance elements. This also results in the internal area of the guidance system being covered. Furthermore, the first elements can be passed by the second guidance elements when the distance between the second elements and a side-piece of a segment is essentially greater than the distance between an outer face of the first element and the side-piece of the segment. This refinement is particularly advantageous when two energy guidance units are guided in opposite senses in one guidance channel.

In the case of a single-sided arrangement, that is to say in the case of an arrangement of an energy guidance unit in a guidance system, the first and the second elements can be arranged at the same distance from the energy guidance unit, if the first elements are arranged at a suitable distance from one another with respect to the second elements. In a situation such as this, the first elements move on their essentially cycloid path between the gaps of the second and of the first guidance elements. The guidance system can be covered by bending over in the upper part of the guidance channel.

In order to reduce friction losses during operation of the energy guidance unit, it is proposed that the first and the second elements be essentially in the form of rollers. The first and the second elements can be connected indirectly or directly to the segments. If required, the first and the second elements can also be connected to a cover or to a cross member of a segment of the energy guidance unit. This allows the elements to be replaced more easily when they have become damaged.

According to yet another advantageous refinement of the invention, catchment elements are provided at a distance from one another in the storage area of the energy guidance unit, that is to say in the area which is opposite the guidance elements. The catchment elements are designed and arranged such that, when the energy guidance unit is being stored, in particular the lower strand, the first elements enter the catchment elements. The catchment elements preferably have an essentially V-shaped cross section.

This measure results in positioning of the first elements and therefore also of the segments of the energy guidance unit. This is particularly important when the energy guidance unit has a relatively large amount of longitudinal play because of wear.

According to yet another advantageous refinement of the energy guidance system according to the invention, the first guidance elements and the second guidance elements are essentially in the form of rollers. A refinement such as this is particularly preferred when the first and the second elements are essentially in the form of strips, with the elements being arranged on some adjacent segments. When the energy guidance unit is in the extended state, the elements which are in the form of strips form an essentially cohesive surface which slides on the guidance elements, which are in the form of rollers.

The energy guidance system according to the invention is particularly advantageous, in particular in conjunction with crane installations since it can even be used where a pivotable cantilever arm of the crane must be supplied with consumables. In contrast to the previously known energy guidance systems, in particular those with guidance carriages, a technical solution is offered which has numerous advantages.

Figure 2:
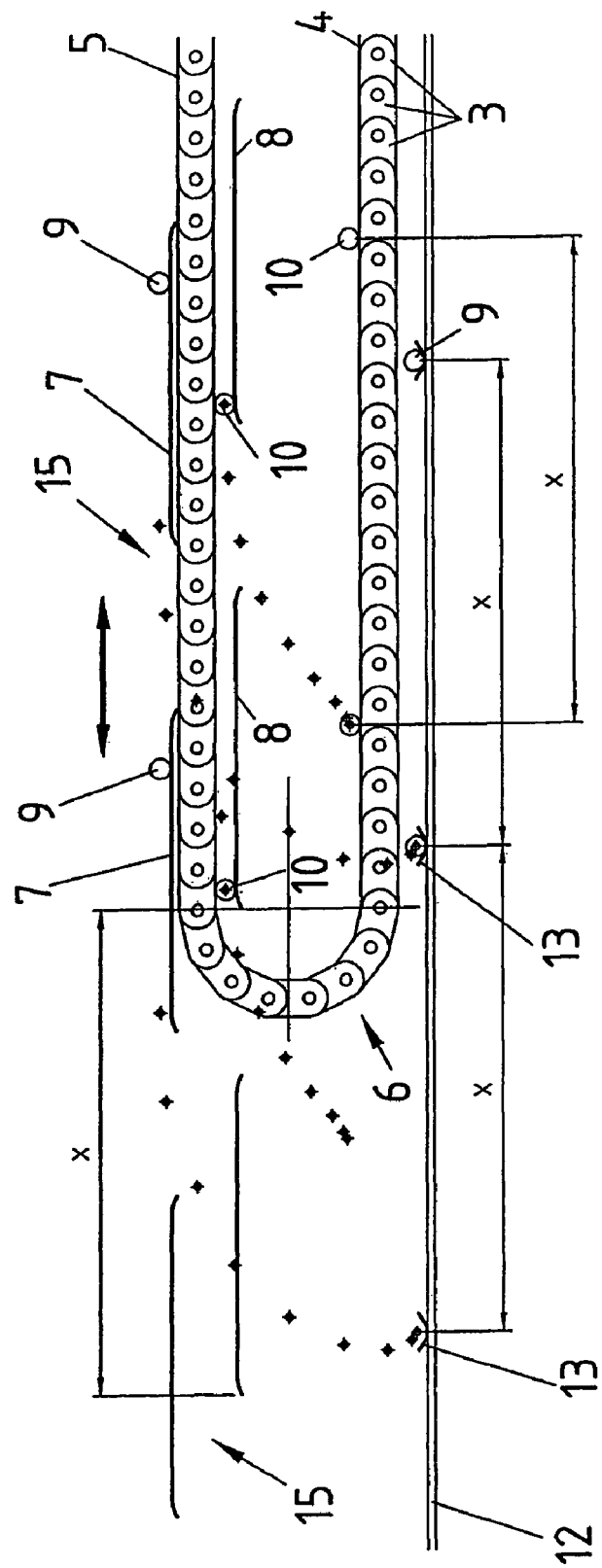
Figure 3:
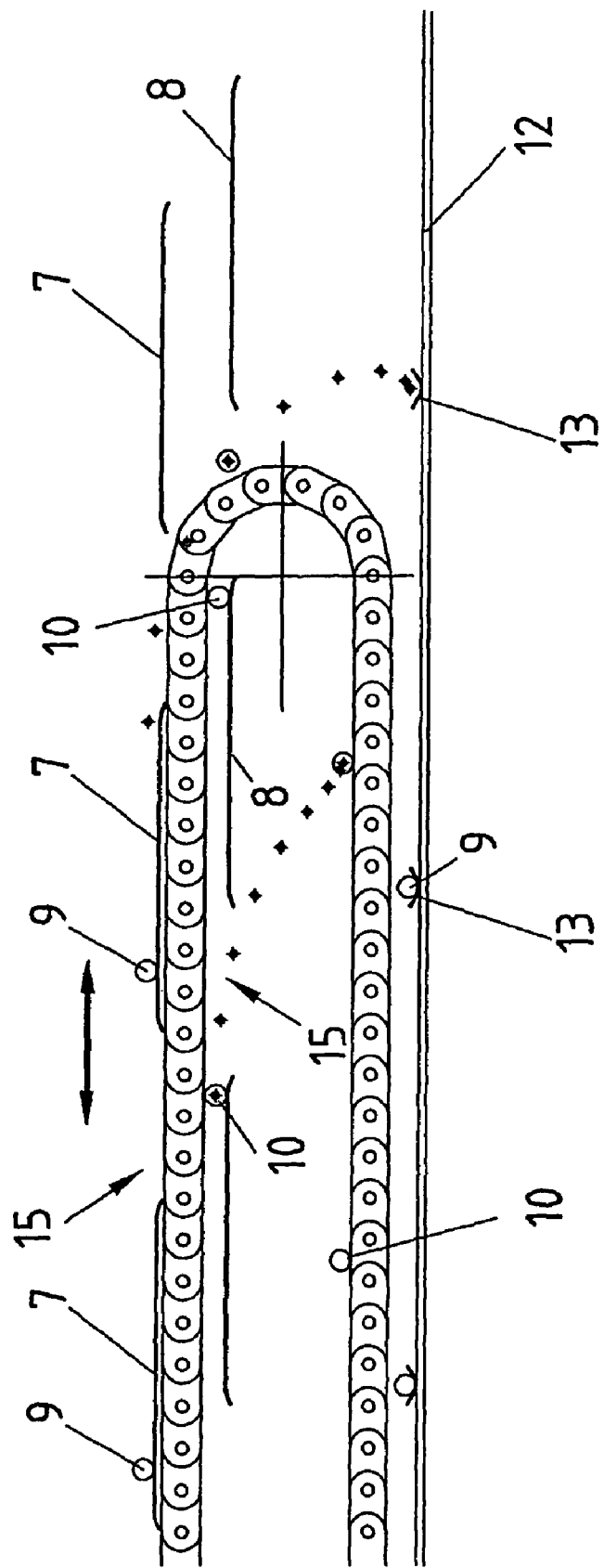
Figure 4:
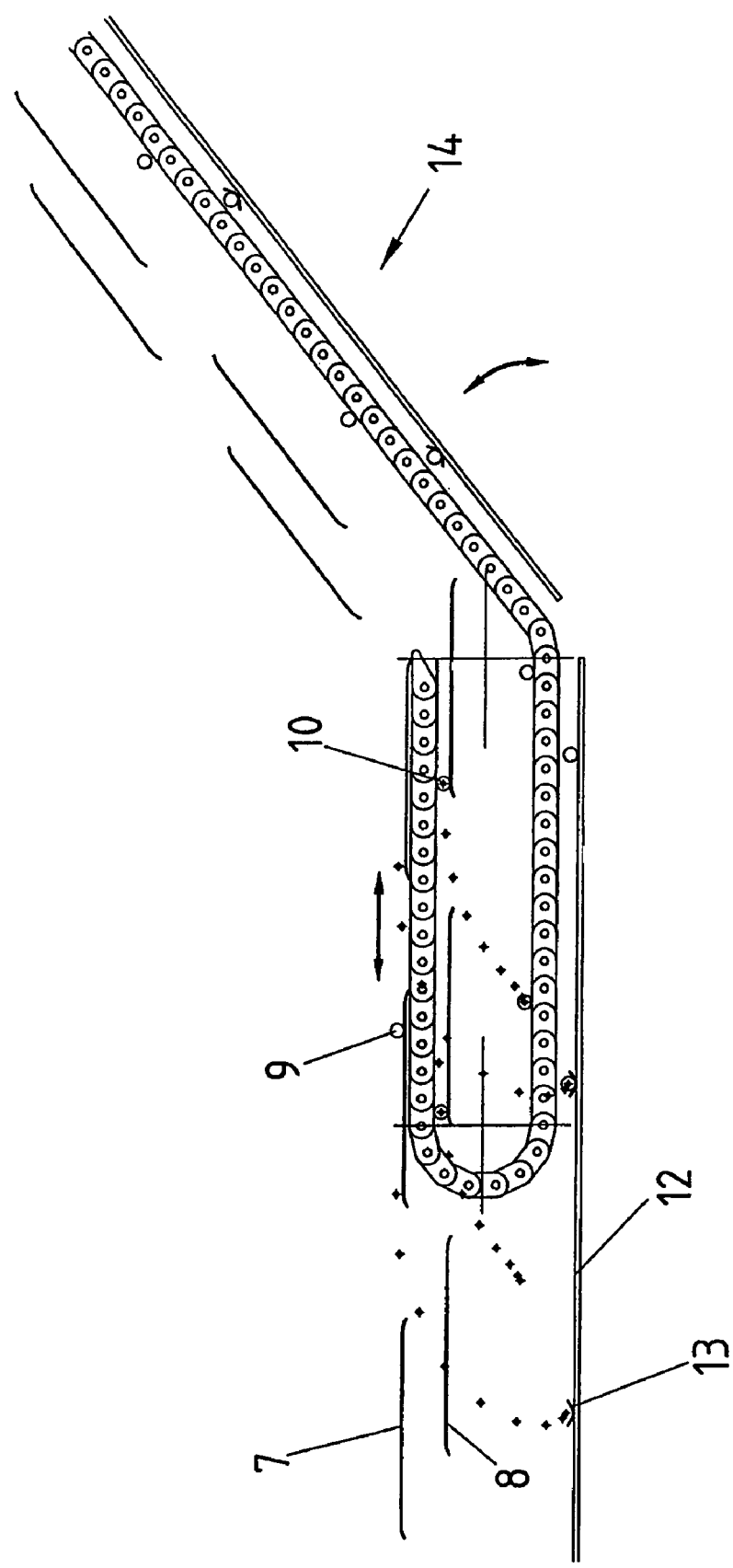
Figure 5:
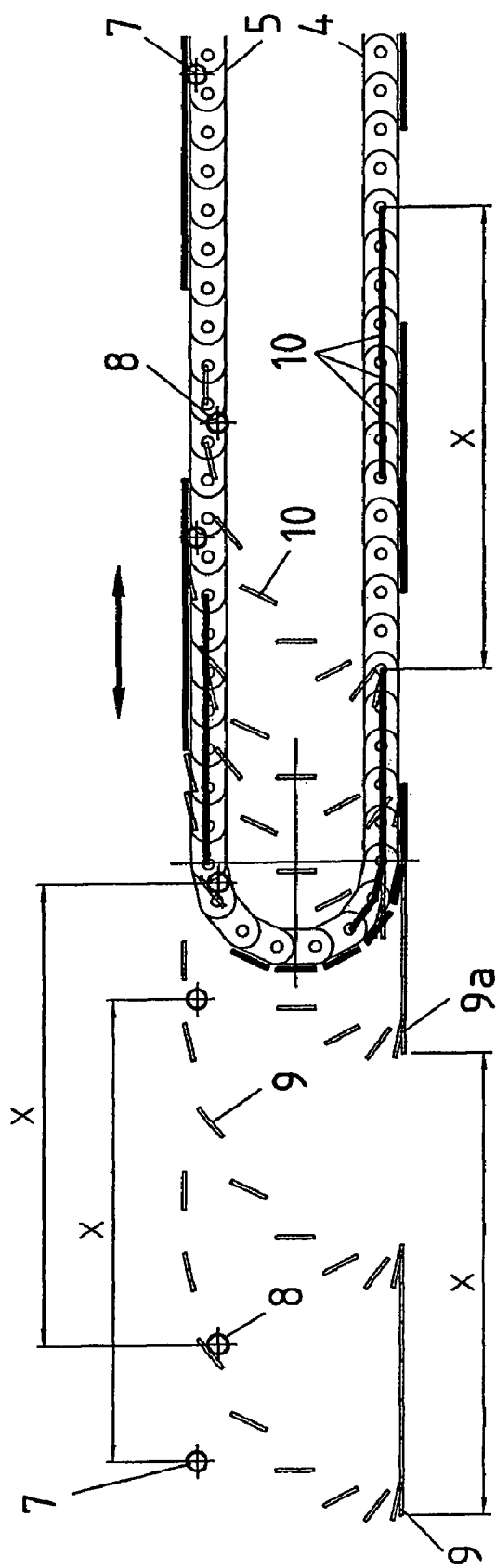
Figure 6:
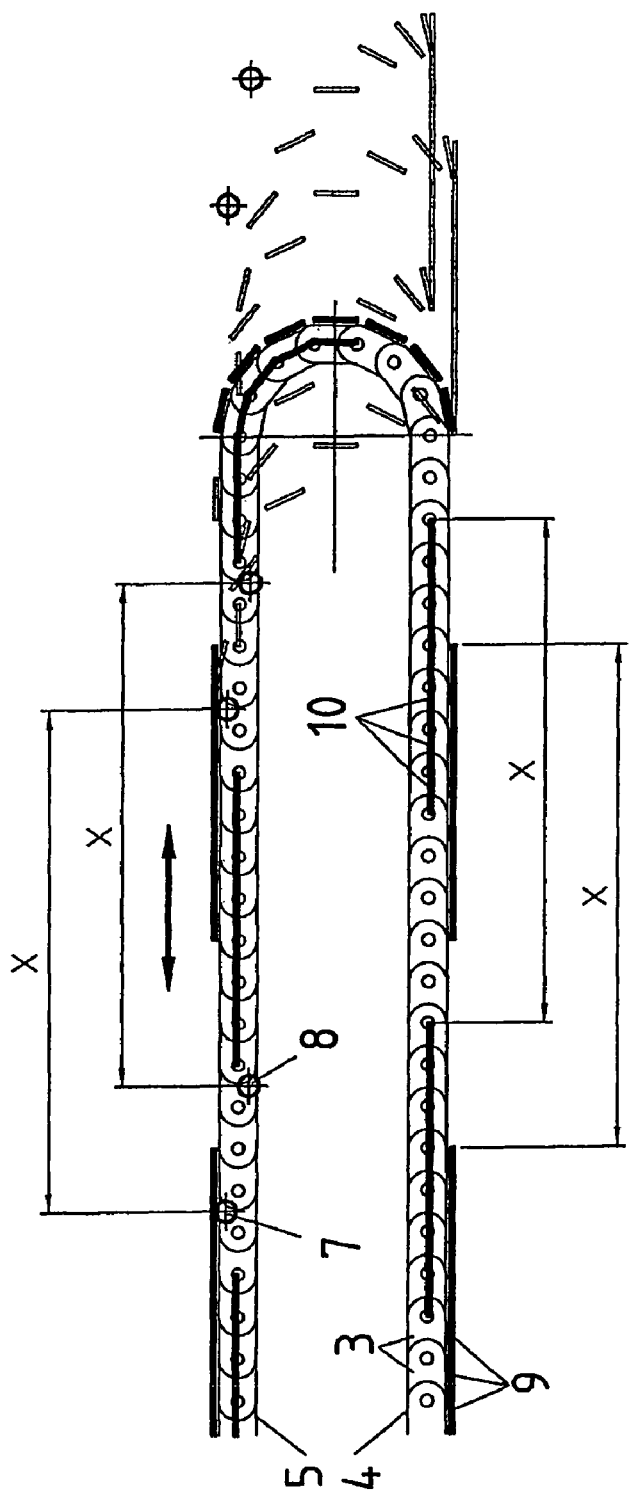
Figure 7:
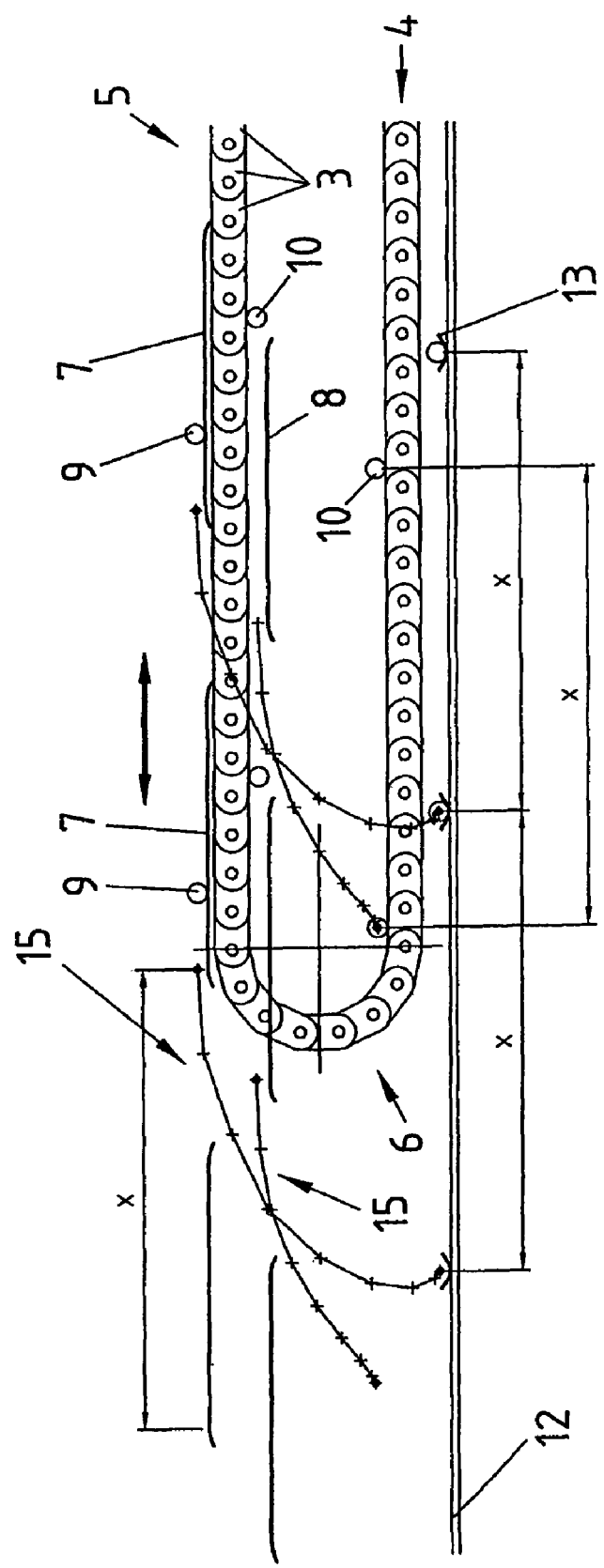
Figure 8:
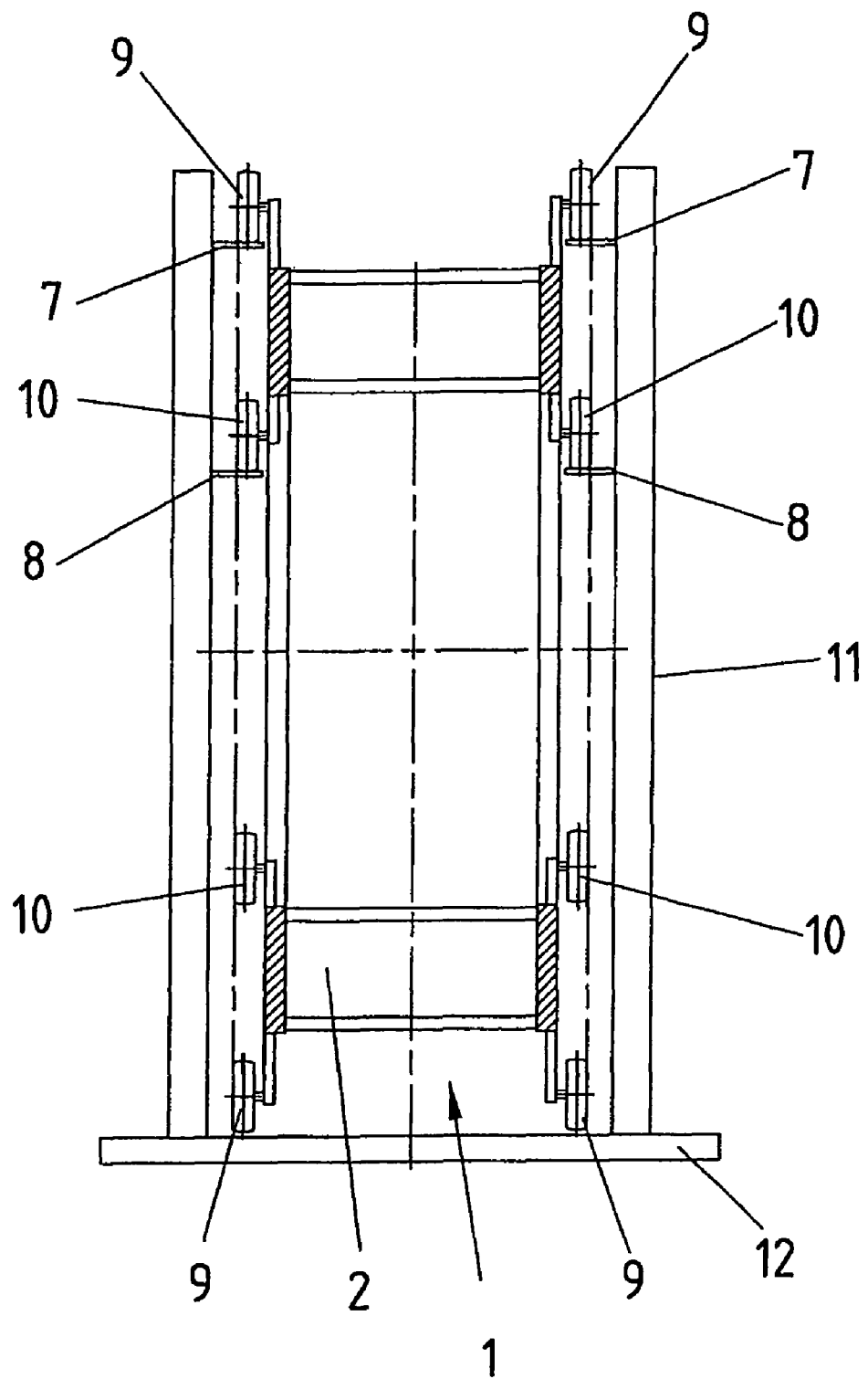

Further advantages and details of the invention will be explained with reference to the exemplary embodiments which are illustrated in the drawing, without the subject matter of the invention being restricted to these specific exemplary embodiments. In the figures:

FIG. 1 shows a front view of and a section through an energy guidance system, FIG. 2 shows a side view of the energy guidance system shown in FIG. 1, FIG. 3 shows a side view of an energy guidance system, FIG. 4 shows a side view of a further exemplary embodiment of an energy guidance system, FIG. 5 shows a side view of a third exemplary embodiment of the energy guidance system, FIG. 6 shows a side view of a fifth exemplary embodiment of the energy guidance system, FIG. 7 shows a side view of a further exemplary embodiment of the energy guidance system, and FIG. 8 shows a front view of and a section through the energy guidance system shown in FIG. 7.

The energy guidance system according to the invention is at least an energy guidance unit for guidance of lines, cables, hoses or the like between a fixed-position and a moving connecting area, with a curved area being formed. The energy guidance unit comprises segments which are connected to one another in an articulated manner. The segments may be formed by so-called chain links. This is not absolutely essential. It is also possible for the energy guidance unit to be formed by a profile which has incisions which extend through side areas and through a cover area. If the energy guidance unit is formed by chain links, then the chain links can be formed by side-pieces which are connected to one another by means of at least one lateral web. The chain links may also be U-shaped. It is also possible for the chain links to be formed integrally. The energy guidance unit can also be closed or partially closed. All the chain links, or some of the chain links, may have covers for this purpose.

The energy guidance unit 1 bounds a channel 2 in which lines, cables, hoses or the like, which are not illustrated, are guided between a fixed-position connecting point and a moving connecting point.

In the illustrated exemplary embodiment, the energy guidance unit 1 is formed by chain links 3 which are connected to one another in an articulated manner. The energy guidance unit 1 has a lower strand 4 and an upper strand 5. A curved area 6 is formed between the lower strand 4 and the upper strand 5, and moves along the movement path.

Particularly in the case of long movement distances and therefore also in the case of long energy guidance units, one problem that arises is that the upper strand may hang down because of the natural weight of the energy guidance unit and the weight of the lines, cables, hoses or the like which are located in the energy guidance unit. Furthermore, the articulated connections of the chain links are heavily loaded.

The embodiment of the energy guidance system illustrated in FIGS. 1 and 2 is an example. The energy guidance unit may also be arranged differently, for example horizontally, hanging or the like.

A guidance system is provided in order to guide the energy guidance unit 1. The guidance system has first guidance elements 7 and second guidance elements 8. The guidance elements 7, 8 are provided on both sides of the energy guidance unit 1, although this is not essential. The guidance elements 7, 8 are essentially in the form of strips. Their end areas are angled toward the lower strand. It is also possible to provide at least one guidance element which, for example, is in the form of a C-profile. This measure prevents the energy guidance chain from bulging upwards in the pushing mode.

The first and the second respective elements 9, 10 interact with the first and second guidance elements 7, 8. The elements 9, 10 are in the form of rollers and are connected to some segments 3 of the energy guidance unit 1. The first elements 9 roll on the first guidance elements 7. The second elements 10 roll on the second guidance elements 8. The first and the second guidance elements 7, 8 are arranged on a supporting structure 11.

The reference sign X denotes the distance between the first and the second elements 9, 10. The distance X also corresponds to the distance between one end of a guidance element and the end of the adjacent guidance element, as can be seen in FIG. 2.

During a movement of the energy guidance unit, the curved area 6 moves along the movement path. While on the movement path, the first elements 9 roll on the first guidance elements 7. The second elements 10 also roll on the second guidance elements 8. The upper strand 5 of the energy guidance unit 1 is guided and supported by the guidance elements and elements. The first and second guidance elements are arranged in places. They form gaps 15 which, in the illustrated exemplary embodiment, are of equal size for the first guidance elements 7 and for the second guidance elements 8. If, as is illustrated in FIG. 2, the energy guidance chain is moved to the left, then the second guidance elements 20 are disengaged from the second guidance elements 8. The first elements 9 are still located on the first guidance elements 7, as a result of which the first guidance elements 7, in conjunction with the first elements 9, now support the upper strand 5 of the energy guidance unit 1. If the energy guidance unit 1 is moved further, then the first elements 9, which are located in the region of the curved area 6, are disengaged from the first guidance elements 7. The movement of the first elements 9 and of the second elements 10 is indicated by the dots in FIG. 2. The elements 9, 10 describe a cycloid path when they are moved from the upper strand with a curved area 6 to the lower stand.

As can be seen from FIG. 1, the pairs formed by the first guidance element 7 and the first element 9 and by the second element 10 and the second guidance element 8 are configured such that, when the first element 9 passes from the upper strand 5 into the lower strand 4, the first element 9 can be moved past the second guidance element 8.

The lower strand 4 is located in the storage area 12. The storage area 12 may, for example, be formed by a floor. It may also be a part of the guidance system. Catchment elements 13 are provided at a distance from one another in the storage area 12. The catchment elements 13 are in the form of troughs and are open at the top. The distance between two adjacent catchment elements 13 corresponds to the distance between two adjacent first elements 9. When the energy guidance unit is being stored, the first elements 9 enter the catchment elements 13, in which they are positioned by the catchment elements 13, which essentially have a V-shaped cross section. This measure results in the first elements 9 always being moved to a defined initial position. This ensures that the elements enter the opening between two guidance elements on their path in the curved area 6, and do not strike the guidance elements. This problem can arise because increasing wear of the energy guidance unit can result in increased longitudinal play between individual segments.

FIG. 3 shows a second exemplary embodiment of the energy guidance system according to the invention. The exemplary embodiment is fundamentally designed in the same way as the exemplary embodiment of an energy guidance system illustrated in FIGS. 1 and 2. The exemplary embodiments illustrated in FIGS. 1 and 2 can be combined with one another such that an arrangement in opposite senses is possible, for example with both energy guidance units being moved via a common driver. It is also possible for the two energy guidance units to be operated in opposite senses by using two mutually independent drivers.

The embodiment of the energy guidance system according to the invention is particularly suitable for long movement distances. Long movement distances such as these occur in particular in the case of crane installations. FIG. 4 shows one exemplary embodiment of the energy guidance system according to the invention, which is used in cantilever arms, which pivot upwards, of cranes, in particular of ship-to-shore cranes. The schematically illustrated cantilever arm 14 can be pivoted in the direction of the arrow. The cantilever arm has a guidance system which continues in that area of the crane which is fixed in position with respect to the cantilever arm 14. The energy guidance unit can be moved essentially independently of the pivot angle of the cantilever arm 14.

FIGS. 5 and 6 show even more exemplary embodiments of the energy guidance system according to the invention. In the exemplary embodiments illustrated in FIGS. 1 to 4, the first and the second elements 9, 10 are in the form of rollers. The first and the second guidance elements 7, 8 are essentially in the form of strips.

FIGS. 5 and 6 show one embodiment of the guidance system in which the first elements 9, 10 are essentially in the form of strips. The elements 9, 10 are arranged on the chain links 3, with these first and second elements being arranged on some chain links such that they essentially form a section in the form of a strip when the energy guidance unit is in the extended position.

In the illustrated exemplary embodiment, the first elements 9 are arranged adjacent to a longitudinal edge of the chain links 3. the second elements 10 are provided between the longitudinal edges of the chain links 3. This arrangement is not essential. It is also possible to provide both the first elements 9 and the second elements 10 at different positions. The elements may be connected to the chain links in an interlocking and/or force-fitting manner. It is also possible to design the side-pieces of the chain links such that these have at least one element. The side-pieces may, for example, be produced from a plastic, with the at least one element on the side-piece being formed or integrally formed as a projection, for example.

The elements can also be in the form of projections from covers or transverse webs or the like, which are connected to the chain links.

The first and the second elements are guided on guidance elements 7, 8. The guidance elements 7, 8 in the illustrated exemplary embodiment are in the form of rollers, in order to keep the friction losses between the guidance elements and the elements low. As can be seen from FIG. 5, the distance X between the first and the second guidance elements is the same. Furthermore, this distance corresponds to the distance between an end area of an element 9 and the end area of an adjacent first element 9*a*.

The movement of a first element 9 and of a second element 10 is illustrated schematically in FIG. 5. The illustration shows that the elements follow an essentially cycloid path.

FIG. 6 shows an energy guidance system arranged in an opposing sense. The configuration of this arrangement in an opposing sense corresponds essentially to the configuration of the exemplary embodiment illustrated in FIG. 5.

FIGS. 7 and 8 show yet another exemplary embodiment of an energy guidance system. The energy guidance system has an energy guidance unit 1. The energy guidance unit 1 bounds a channel 2 in which lines, cables or hoses can be arranged. The energy guidance unit 1 is formed by chain links 3 which are connected to one another in an articulated manner. As can be seen from the illustration in FIG. 7, the energy guidance unit 1 has a lower strand 4 and an upper strand 5. A curved area 6 is formed between the lower strand 4 and the upper strand 5. The position of the curved area 6 varies along the movement path depending on the movement of the energy guidance unit.

A guidance system is provided in order to guide the energy guidance unit 1. The guidance system has first guidance elements 7 and second guidance elements 8. The guidance elements 7, 8 are arranged on both sides of the energy guidance unit 1. As can be seen from the illustration in FIG. 7, the first and second guidance elements 7, 8 extend over sub-areas of the movement path. Gaps are provided between successive first guidance elements 7 and between successive second guidance elements 8. The first and the second guidance elements 7, 8 are arranged on a supporting structure 11.

Elements 9, 10 are connected to the energy guidance unit 1. The elements 9, 10, as can be seen from the illustration in FIG. 7, have an essentially circular cross section. The elements 9, 10 are mounted such that they can rotate, in such a way that first elements 9 roll on the first guidance elements, while the second elements 10 roll on the second guidance elements 8.

As can be seen from the illustration in FIG. 8, the first and the second elements 9, 10 are arranged such that they are essentially aligned. The distance between the elements 9, 10 and the side-pieces of the links 3 is the same.

During the movement of the energy guidance unit, the curved area 6 moves along the movement path. The first elements 9 roll on the first guidance elements 7. The second elements 10 also roll on the second guidance elements 8. The upper strand 5 of the energy guidance unit 1 is supported by the guidance elements and elements.

Gaps 15 are provided between the first guidance elements 7 and between the second guidance elements 8. The gaps 15 in the illustrated exemplary embodiment have the same length. The guidance elements 7, 8 are arranged such that the first elements 9 or the second elements 10 roll on the first guidance elements 7 or on the second elements 8, in such a way that the upper strand 5 is always supported.

When an element 9 or 10 enters a gap, then it is moved along an essentially cycloid path, as is illustrated schematically in FIG. 7, in such a way that it moves from the upper strand to the lower strand.

The lower strand 4 is located in a storage area 12. Catchment elements 13 are provided, and are preferably V-shaped. The distance between two adjacent catchment elements 13 is annotated X. This corresponds essentially to the distance between the adjacent first elements 9. The first elements 9 are positioned by the catchment elements 13. This ensures that the first elements 9 are always moved to a defined initial position.

The movement paths illustrated in FIG. 7 also correspond to the movement path of a guidance element which is located in the lower strand 4, when the curved area is moved to the right with reference to FIG. 7, and the corresponding chain link is moved from the lower strand to the upper strand.

LIST OF REFERENCE SYMBOLS

1 Energy guidance unit
2 Channel
3 Chain link
4 Lower strand
5 Upper strand
6 Curved area
7 First guidance element
8 Second guidance element
9 First element
9*a* First element
10 Second element
11 Supporting structure
12 Storage area
13 Catchment element
14 Cantilever arm
15 Gap

The invention claimed is:

1. An energy guidance system comprising:
   an energy guidance unit for movement between a fixed-position and a moving connecting area, and including segments connected to one another in an articulated manner;
   a first guidance element disposed in a first plane and a second guidance element disposed in a second plane, and spaced apart from the first guidance element, a first element joined to the energy guidance unit and a second element joined to the energy guidance unit and the first element interacts with the first guidance element, and the second element interacts with the second guidance element; and
   a catchment element disposed opposite the guidance elements into which the first element can be received to define an initial position along a movement path of the first element.

2. The energy guidance system of claim 1, wherein the guidance element is essentially in the form of a strip.

3. The energy guidance system of claim 2, wherein the first guidance element comprises a central portion and an end area and the end area is disposed at an angle relative to the central portion.

4. The energy guidance system of claim 1, wherein the first guidance element is spaced apart from the energy guidance unit at a first distance and the second guidance element is spaced apart from the energy guidance unit a second distance that is less than the first distance.

5. The energy guidance system of claim 4, wherein the distance between the second guidance element and the energy guidance unit corresponds at least to a width of the first element.

6. The energy guidance system of claim 1, wherein the first element and the second element each include a roller.

7. The energy guidance system of claim 1, and further comprising:
   a second catchment element disposed opposite the guidance elements into which the second element can be received.

8. The energy guidance system of claim 1, wherein the first element comprises a first roller and the second element comprises a second roller.

9. The energy guidance system of claim 8, wherein the first guidance element and the second guidance element each define a strip, and the first element and second element are arranged on two adjacent segments of the energy guidance unit.

10. The energy guidance system of claim 1, wherein the first element is connected to a side-piece of a segment of the energy guidance unit.

11. The energy guidance system of claim 1, wherein the second element is connected to a side-piece of a segment of the energy guidance unit.

12. The energy guidance system of claim 1, wherein the catchment element is substantially v-shaped in cross section.

\* \* \* \* \*